United States Patent [19]

Greve et al.

[11] Patent Number: 5,273,606

[45] Date of Patent: Dec. 28, 1993

[54] BONDING TECHNIQUE FOR A MULTI-PANEL DEVICE

[75] Inventors: Bruce N. Greve, Davisburg; Richard B. Freeman, Oxford, both of Mich.

[73] Assignee: The Budd Company, Troy, Mich.

[21] Appl. No.: 807,610

[22] Filed: Dec. 16, 1991

[51] Int. Cl.⁵ ............................................. B32B 31/16
[52] U.S. Cl. .................................. 156/216; 156/223;
156/305; 264/261; 264/263; 29/509
[58] Field of Search ............... 156/216, 223, 292, 305,
156/196; 264/261, 263; 29/509, 469.5; 296/29,
76; 52/631

[56] References Cited

U.S. PATENT DOCUMENTS

| | | |
|---|---|---|
| 2,040,126 | 5/1936 | Grieve . |
| 2,402,717 | 6/1946 | Winer .............. 264/261 X |
| 2,607,061 | 8/1952 | Leahy . |
| 2,718,664 | 9/1955 | Schweitzer ........ 264/261 X |
| 3,075,802 | 1/1963 | Lowe . |
| 3,263,014 | 7/1966 | Deisenroth ............ 264/261 |
| 3,612,614 | 10/1971 | Ware . |
| 3,680,910 | 8/1972 | Stanner . |
| 3,822,464 | 7/1974 | Hester et al. . |
| 3,847,694 | 11/1974 | Stewing . |
| 3,909,918 | 10/1975 | Takizawa et al. . |
| 3,909,919 | 10/1975 | Miyabayashi et al. ........ 29/509 X |
| 4,498,264 | 2/1985 | McCafferty et al. . |
| 4,719,689 | 1/1988 | Yamamoto et al. . |
| 4,719,689 | 1/1988 | Yamamoto et al. ......... 296/29 X |
| 4,827,595 | 5/1989 | Dacey, Jr. ................ 29/509 X |

FOREIGN PATENT DOCUMENTS 3811427  10/1989  Fed. Rep. of Germany ........ 296/29

Primary Examiner—Michael W. Ball
Assistant Examiner—Michele K. Yoder
Attorney, Agent, or Firm—Harness, Dickey & Pierce

[57] ABSTRACT

A method and apparatus are disclosed for bonding a multi-panel device together by injecting a liquid adhesive into a flow channel created by a hem flange located along a perimeter of two contacting panels. The adhesive is then cured and thus forms a permanent bond between the panels.

8 Claims, 1 Drawing Sheet

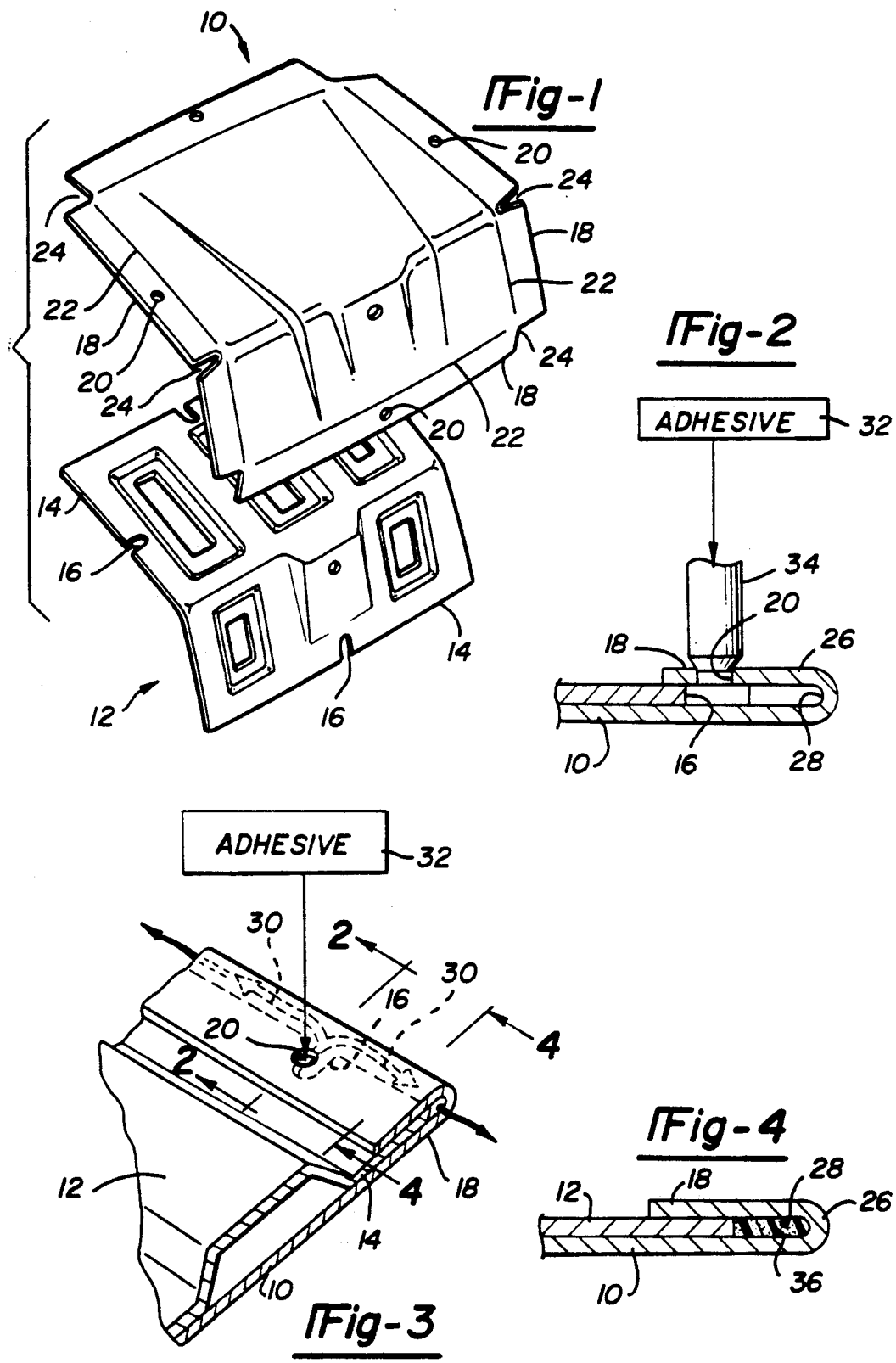

BONDING TECHNIQUE FOR A MULTI-PANEL DEVICE

BACKGROUND OF THE INVENTION

1. Technical Field

This invention relates to bonding equipment and methods and is particularly concerned with an apparatus and method for bonding together matching sheets of a multi-panel device.

2. Discussion

A multi-panel device serves many functions and is used, for example, as a door or lift gate in vehicles. Such a device is fabricated by securing an inner panel to an outer panel through the use of a bond between adjacent surfaces of the panels brought in contact with each other. The inner and outer panels may be constructed of such materials as steel or plastic. Methods for securing these steel or plastic panels together often used in industry today utilize several liquid adhesive bonding techniques.

Presently, one of the bonding techniques employed by those skilled in the art uses robotic devices to apply an adhesive substance to the contact surface of one of the panels. A second panel is then positioned on the first panel in contact with the surface to which the adhesive was applied. The adhesive material is then cured by applying heat or RF energy to permanently bond the two panels together.

Shortcomings associated with these techniques include difficulties in achieving the desired location, bead size and quantity of adhesive. To address these difficulties, time or labor intensive procedures are typically required to ensure that the adhesive bead is applied to the proper surface location and is of sufficient size to effect a secure bonding of the panels, while preventing the use of excess quantities which may create beads of wasted adhesive around the edges of the bonded panels, collect within non-contacting channels of the panels or escape from the panels to adjacent surfaces. For adhesives which cure at ambient temperatures, the open time (the time available to position the second panel on the first panel before the adhesive cures) places time limitations on bonding techniques that can be successfully used. For example, a power failure on the assembly line after adhesive beads have been applied to several of the panels would result in adhesive curing before the placement of the other panel or panels onto the adhesive-laden panels. Thus, the defect rate when applying an adhesive bead with a robot may be high as a result of these and other manufacturing problems. Because robotic devices are frequently used in these procedures, manufacturing the device becomes more costly.

Expensive sophisticated equipment capable of the detail required for the adhesive application procedure is usually utilized to ensure that the proper amount of adhesive is dispensed and that no excess adhesive is squeezed onto exterior visible surfaces of the panels. Because excess adhesive on these exterior surfaces could cause mechanical malfunctions and aesthetic defects, the robotic device generally leaves skips and voids in its application of the adhesive to avoid adhesive squeeze-out. Robots occasionally encounter problems going around corners of the panels when applying adhesive beads in this manner, however, and the additional programming required to achieve desirable results creates further expenses, both in labor and in time.

The need therefore exists for a new method and apparatus for bonding multi-panel devices which is capable of easily and inexpensively applying the proper amount of an adhesive, without the need for time and labor intensive procedures.

SUMMARY OF THE INVENTION

In accordance with the teachings of the preferred embodiment of this invention, a bonding technique is provided for creating a multi-panel device. The method includes positioning a first panel in contact with a second panel, which is shorter in length than the first panel in at least one direction, such that at least one edge of the first panel extends beyond, but substantially parallel to the corresponding edge or edges of the second panel. The longer edge portion of the first panel is folded over the edge portion of the second panel so that the first panel edge portion engages in firm contact along the edge portion of the second panel. This creates a sealed flow channel long corresponding edges of both panels, enclosed by the edge of the first panel and the surrounding edge portion of the second panel, into which an adhesive is injected. Preferably, the adhesive is injected through one or more holes in the first panel edge portion, prealigned with notches cut into the second panel edge portion. The adhesive is then cured to bond the two edge portions together.

BRIEF DESCRIPTION OF THE DRAWINGS

The various advantages of the present invention will become apparent to one skilled in the art after reading the following specification and by reference to the drawings in which:

FIG. 1 is a perspective view illustrating the positional relationship between typical inner and outer panels to be positioned together for bonding;

FIG. 2 is a partial cross-sectional view of the outer panel edge portion folded over the inner panel edge portion, taken along the line 2—2 of FIG. 3;

FIG. 3 is a perspective view of the outer panel edge portion folded over the inner panel edge portion; and FIG. 4 is a partial cross-sectional view of the resulting bonded edge region of the multi-panel device, taken along the line 4—4 of FIG. 3.

DETAILED DESCRIPTION OF THE PREFERRED EMBODIMENT

It should be understood from the outset that while this invention is described in connection with a particular example, the scope of the invention need not be so limited since those skilled in the art will appreciate that its teachings can be used in a much wider variety of industrial applications than the examples specifically mentioned herein.

FIG. 1 is a perspective view illustrating the positional relationship between an outer panel 10 and an inner panel 12 to be positioned together for bonding. The outer panel 10 typically forms the aesthetic skin for the vehicle part such as the rear truck lid shown herein, while the inner panel 12 has ribs and the like to reinforce the outer panel 10. The techniques can also be used, of course, for a variety of other parts. The inner panel 12 contains a plurality of edge portions, generally indicated at 14. The inner panel edge portions 14 contain a plurality of adhesive injection notches 16, which are created at regular intervals along the perimeter of the inner panel 12.

The outer panel 10 contains a plurality of edge portions, generally shown at 18, which extend outwardly from the outer panel 10 to a greater distance than, but substantially parallel to, the corresponding edge portions 14 located on the inner panel 12. The outer panel edge portions 18 contain a plurality of adhesive injection holes 20, which are aligned with the corresponding adhesive injection notches 16 located along inner panel edge portions 14.

After bringing the outer panel 10 and inner panel 12 into an aligned close-contact position with each other, the outer panel edge portions 18 are folded around the inner panel edge portions 14 along lines 22 in FIG. 1. The outer panel edge portions 18 are folded over so as to form a hem flange as indicated by reference numeral 26 in FIG. 2, and also so that the adhesive injection holes 20 align with the adhesive injection notches 16 to create an inlet passageway through which a liquid adhesive material can be injected. In the preferred embodiment of a multi-panel device being secured around all edges, the hem flange 26 is created along the entire perimeter of the outer panel 10 and inner panel 12 by standard hem flanging equipment. A flow channel 28, shown in FIG. 2 and designated by the phantom lines in FIG. 3, is formed around the perimeter of the two panels as a result of the hem flange 26. The arrows 30 located within the flow channel 28 indicate the directions in which a liquid adhesive material 32 will travel within the flow channel 28 when forced by a slight amount of pressure through the adhesive injection holes 20 and adhesive injection notches 16 and into the flow channel 28 through the use of an adhesive dispensing device 34, such as a gun or nozzle, positioned in contact with adhesive injection holes 20, as shown in FIG. 2. When a series of cuts or notches 24, as shown in FIG. 1, are made in the outer panel edge portions 18, the folding of the outer panel edge portions 18 over the inner panel edge portions 14 will result in a flow channel that is continuous around all corners and bends of the multi-panel device.

Liquid adhesive material 32 is dispensed through the adhesive injection holes 20 and into the flow channels 28 until the entire distance of the flow channels has become filled with the adhesive material 32. In the preferred embodiment, the adhesive is then cured through a simple room temperature chemical reaction cure, thus creating a permanent bond at the edges of the panels 10 and 12. Alternately, induction heating of the adhesive may be employed. FIG. 4 is a cross-sectional view of the resulting bonded edge region of the multi-panel device, taken through a section not corresponding to an adhesive injection hole and notch. The cured adhesive is indicated within the flow channel by reference numeral 36 in FIG. 4.

The present invention overcomes several problems encountered by the prior art. The method utilized circumvents the need for much of the costly and time-consuming programming procedures associated with skips and voids used in a previous method of adhesive application, and thus eliminates the need for critically programmed robotic equipment. The degree of precise care required to pump an adhesive into a sealed flow channel is not nearly as great as that required by robots to turn corners and utilize skips and voids in applying adhesive. Also, because the adhesive is injected into a sealed flow channel, the presently disclosed invention eliminates the need for extra quality control equipment and/or inspection procedures to ensure that the correct amount of adhesive is applied and that excess adhesive is not squeezed out of the bond onto the panel surfaces.

While the above detailed description describes a preferred embodiment of the present invention, it will be understood that the description is exemplary in nature and is not intended to limit the scope of the invention. The present invention will therefore be understood as susceptible to modification, alteration and variation by those skilled in the art without deviating from the scope and meaning of the following claims.

What is claimed is:

1. A method of securing two panels together to create a multi-panel device comprising the steps of:

providing a first panel;

providing a second panel shorter in length in at least one direction than the first panel;

placing the second panel adjacent to the first panel;

folding an edge portion of the first panel onto said second panel so that the edge portion engages in firm contact with a mating surface along an edge of the second panel thereby creating a sealed flow channel along a substantial length of the panels;

thereafter, injecting an adhesive substance into the flow channel; and curing the adhesive to bond the two panels together.

2. The method of claim 1 which further comprises:

forming an inlet passageway in the panels; and injecting the adhesive through the passageway into the flow channel.

3. The method of claim 2 wherein the inlet passageway is formed by the steps of:

creating a hole in one panel;

creating a notch in another panel; and aligning the notch with the hole when the first panel is folded.

4. The method of claim 1 further comprising:

cutting an edge portion of said first panel so that a continuous sealed flow channel is created around a perimeter of the panels upon folding an edge portion of the first panel onto said second panel.

5. A method of forming a multi-panel device comprising:

providing an inner panel with a notch in an edge thereof;

providing an outer panel with a hole near an edge thereof;

placing the inner panel adjacent to the outer panel;

bending the edge of the outer panel around the edge of the inner panel to come in firm contact with the inner panel in order to create a sealed longitudinal flow channel and to align the hole over the notch thereby defining an inlet passageway into the flow channel;

thereafter, injecting an adhesive substance into the longitudinal flow channel through the inlet passageway; and curing the adhesive to bond the two panels together.

6. The method of claim 5 further comprising forming a hem flange to create a flow channel substantially along the entire perimeter of both panels.

7. The method of claim 6 further comprising constructing said inner and outer panels of steel.

8. The method of claim 5 wherein the outer panel is a skin used on an exterior automotive part and the inner panel is a reinforcing member.

* * * * *